Jan. 11, 1938.   P. SCHLUMBOHM   2,105,098
REFRIGERATING PROCESS
Filed Oct. 27, 1932   2 Sheets-Sheet 1
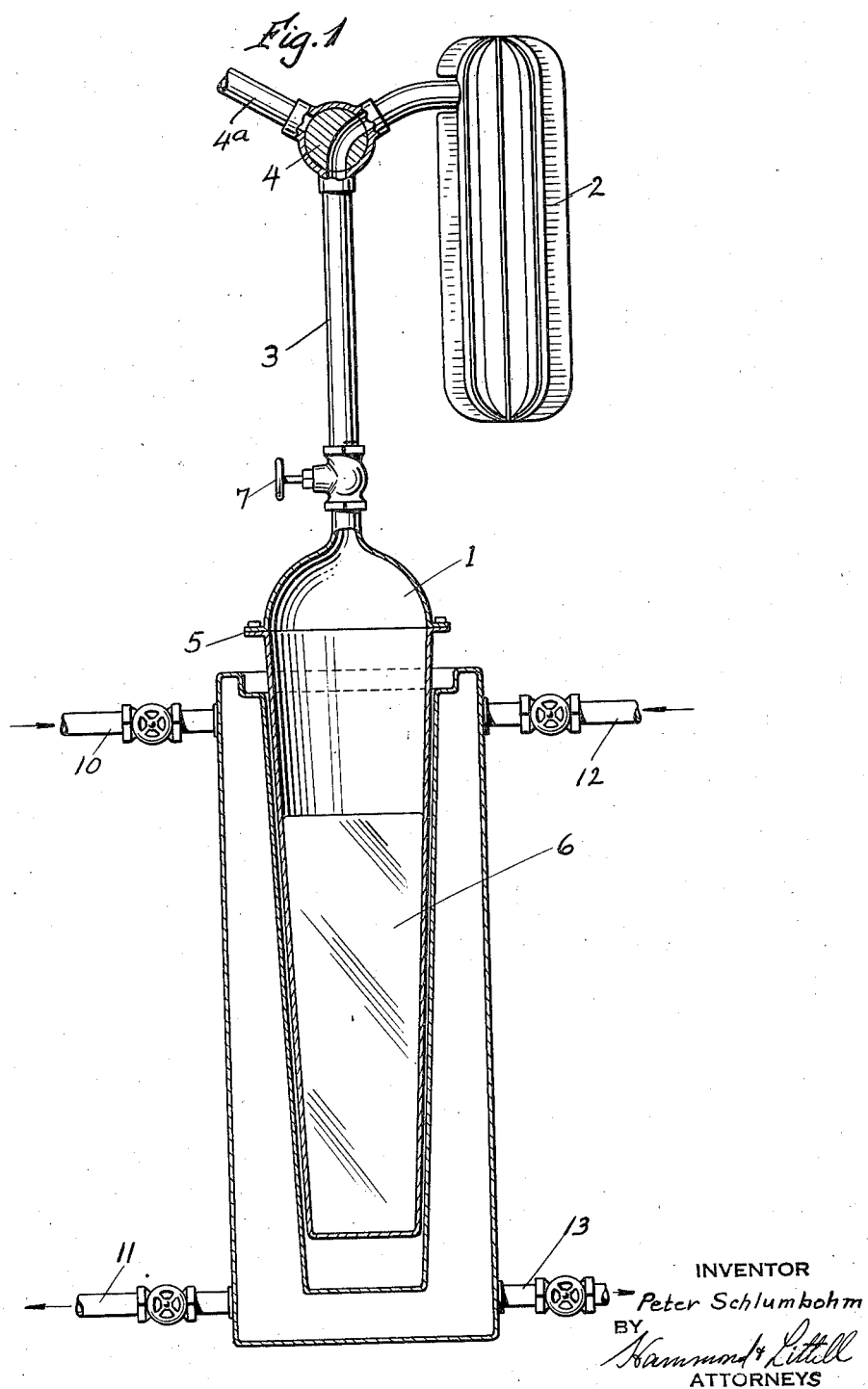

Jan. 11, 1938.　　P. SCHLUMBOHM　　2,105,098
REFRIGERATING PROCESS
Filed Oct. 27, 1932　　2 Sheets-Sheet 2
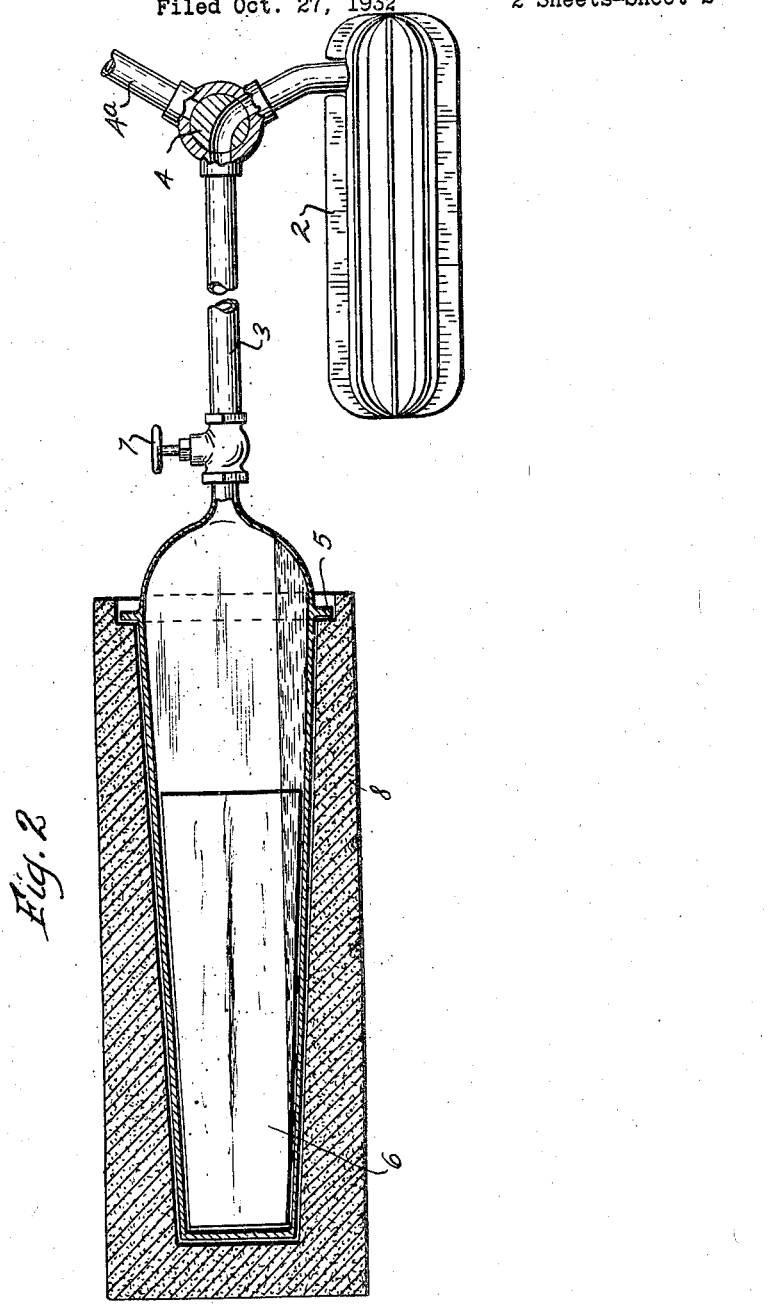
INVENTOR
Peter Schlumbohm
Hammond & Littell
ATTORNEYS Patented Jan. 11, 1938

2,105,098

UNITED STATES PATENT OFFICE 2,105,098

REFRIGERATING PROCESS

Peter Schlumbohm, Berlin, Germany

Application October 27, 1932, Serial No. 639,863
In Germany October 31, 1931

10 Claims. (Cl. 62—179)

My invention relates to a refrigerating system which is based on the absorption principle. One special purpose of my invention is to create low temperatures. The obtainment of low temperatures with absorption refrigerating machines is a problem which has not been solved satisfactorily heretofore.

My invention is to apply the absorbing means in the aggregate state of an ice. This means for example in a system of ammonia and water, that following my invention the vapors of the ammonia are not absorbed by liquid water, but by water ice. At first sight this appears to be paradox, but surprisingly good results have been obtained, the theoretical reasons of which are:

By absorbing the vapor of ammonia at the surface of the water ice, a melting of the ice is caused. The melting of the ice has three favorable effects:

(a) The surface of the absorbing means is continuously renewed, (b) The absorption heat is taken up instantly by the melting ice, (c) The pressure in the absorber remains constantly very low.

It will be understood that under these circumstances there is a possibility of obtaining very low temperatures of the evaporating refrigerant.

An object of my invention is to provide a refrigerating system giving new possibilities for the water ice industry. This industry is at the present time handicapped by the insufficient temperature effect of their product in their competition with mechanical refrigerators and carbon dioxide ice. My invention enables the water ice industry to use their industrial equipment in connection with my new system and to supply their clients with means for obtaining any desired temperature effect. This can be done both by using the normal product in connection with my new absorption refrigerating machine or by using the existent technical equipment, e. g. cold brine, of that industry to freeze water which is inside of my absorption machine to ice.

I want to make it clear, however, that the ice needed for my absorption machine has not necessarily to be pure water ice, but that the state of aggregation "ice" is the important factor. Frozen brines made from aqueous solutions could be used as well and with special advantage for creating low temperatures. To point out the general idea of the invention clearly I might formulate that in my system of refrigeration liquid absorbing means are frozen into ice before being applied for absorbing the vapors of the refrigerant.

The invention is illustrated diagrammatically and by way of exemplification in the accompanying drawings.

Figs. 1 and 2 illustrate a periodic absorption machine. Fig. 1 illustrates the requirements for conditioning the machine prior to its use for refrigerating purposes, whereas Fig. 2 illustrates features of the system while being in use for refrigerating purposes. The machine itself comprises an absorber 1, an evaporator 2, a connecting tube 3 between absorber and evaporator and a shut-off valve 7 in the connecting tube 3. The absorber contains the absorbing means 6 and the evaporator contains the refrigerant.

The machine as shown in Fig. 1 may be conditioned in a twofold manner: first, a block of ice as frozen in the usual manner by the ice industry may be filled into the empty absorber which has been opened by means of the flange connection 5. After having filled the absorber 1 with ice 6, after having closed the flange connection 5 and after having filled the evaporator 2 with refrigerant, the air has to be eliminated from the system as carefully as possible.

A method of conditioning an absorption refrigerating machine by removing the air completely has been described in my copending patent application Ser. No. 158,139, filed August 9, 1937, for "Method of conditioning a refrigerating absorption system." The three-way valve 4 as shown in Fig. 1 is a technical means for applying that method. Before putting the valve into the position as illustrated in Fig. 1, which establishes communication between the evaporator 2 and the absorber 1, the valve has served in its two other potential positions to withdraw air through tube 4a separately from the absorber 1 and from the evaporator 2.

Or, the machine as illustrated in Fig. 1 may be conditioned in the following way:

The absorber 1 is filled with a mixture of absorbing liquid and refrigerant and the evaporator 2 is practically empty. The valve 7 is open; the valve 4 with tube 4a is not necessarily provided in tube 3, as the system is supposed to have been evacuated once forever.

To start the boiling period of this periodical absorption machine the absorber 1 is placed inside a heating jacket which is double walled and which may be heated by steam. The steam enters through tube 10 and leaves through tube 13. After having expelled the refrigerant from the absorbing means and having it condensed in the evaporator 2, the valve 7 shuts off the connecting tube 3. The absorbing means are now frozen into ice by applying cold to the absorber. This may be done by replacing the steam in the double walled jacket by a cold brine, which enters through tube 12 and leaves through tube 11. It is practical, however, to build the absorber 1 in the shape of a standard ice cell of the water ice industry and to place the absorber directly into brine like an ice cell. During this freezing period the absorber is in a vertical position as shown in Fig. 1. After the absorbing liquid has been frozen into ice, the machine may be inserted into a heat insulating jacket 8 surrounding the absorber 1, as illustrated in Fig. 2. For starting the absorbing period of the machine the valve 7 is opened; the vapors of the refrigerant are allowed to flow through the tube 3 into the absorber 1, where they are absorbed by the ice 6. In order to keep the mass of the ice outside of the water, I prefer to arrange the absorber 1 during the absorption period in a suitable position, e. g. in a horizontal position, as illustrated in Fig. 2. After all refrigerant has been absorbed by the ice the boiling period can begin again by heating the absorber 1.

Any additional equipment, as used in absorption refrigerating machines, like thermostatic control, means for bringing back water from the condenser/evaporator 2 into the boiler/absorber 1 etc., can be used in connection with my new principle. Therefore, I can restrict myself to diagrammatic illustrations and exemplifications.

As refrigerants I use in connection with aqueous absorbing means vaporizable chemical substances which are highly soluble in water, such as ammonia, hydrochloric acid, acetone, ethyl alcohol, methyl alcohol.

Hydrochloric acid has not yet been used as a refrigerant. It can be used in connection with my process to special advantage for obtaining low temperatures, because the vapor pressure curve shows at these low temperatures still reasonably high pressures to provide a sufficient vapor pressure-fall between evaporator and absorber. It will be realized that this fall can be increased by lowering the vapor pressure of the "rich solution" in the absorber.

Following my invention it is possible to reduce the vapor pressure of the rich solution as constituted by the sum of the partial pressure of the absorbing liquid and of the partial pressure of the absorbed refrigerant by causing the formation of a salt due to a chemical reaction between the absorbing liquid and the refrigerant. This means that I provide a base as absorbing means and an acid as refrigerant or, vice versa, an acid as absorbing means and a base as refrigerant. For example, I might make use of the reaction

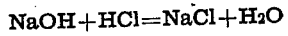
$$NaOH + HCl = NaCl + H_2O$$

by freezing an aqueous solution of NaOH into ice and applying it in the absorber to absorb the vapors of the acid refrigerant HCl. Or I may use a frozen diluted acid as absorbing means in the absorber to absorb the vapor of a basic refrigerant like ammonia.

It will be understood that this invention is not limited to the specific arrangements herein shown or suggested since the invention can and should be adapted to different conditions in various ways, according to the skill and judgment of someone familiar with this art.

I claim as my invention:

1. The method of refrigeration which comprises evaporating a refrigerant to produce refrigeration and causing an absorption of the refrigerant vapor by frozen absorbing material that melts to a liquid during the absorbing.

2. The method of refrigeration defined in claim 1 characterized by the use of ammonia as the refrigerant.

3. The method of refrigeration defined in claim 1 characterized by the use of methyl alcohol as the refrigerant.

4. The method of refrigeration defined in claim 1 characterized by the use of hydrochloric acid as the refrigerant.

5. The method of refrigeration defined in claim 1 characterized by the use of hydrochloric acid as the refrigerant and water ice as the frozen absorbing material.

6. The method of refrigeration defined in claim 1, characterized by the fact that either the refrigerant or the absorbent is acid and the other is basic.

7. The method of refrigeration defined in claim 1 characterized by the use of water ice as the frozen absorbing material.

8. The method of refrigeration defined in claim 1 characterized by the use of frozen brine as the frozen absorbing material.

9. The method of refrigeration which comprises causing evaporation of a refrigerant, absorption of the refrigerant vapor by frozen absorbing material that melts to a liquid during the absorbing, removal of the refrigerant from the liquid absorbing material and freezing of the liquid material for re-use in the method set forth.

10. A refrigerating unit comprising a closed circuit having an evaporator chamber, an absorber chamber and a conduit connecting the same, a volatile refrigerant in the evaporator chamber, frozen absorbing material that melts to a liquid during the absorbing in the absorber chamber to absorb vapor of a refrigerant evaporated in the evaporator chamber and to be melted thereby, means for applying heat to the absorber chamber to drive off absorbed refrigerant from the solution formed in the absorber chamber and means to freeze the solution therein to ice.

PETER SCHLUMBOHM.